(12) United States Patent
Rayman

(10) Patent No.: US 6,619,351 B2
(45) Date of Patent: Sep. 16, 2003

(54) TWO PIECE TIRE WITH A CONVECTIVE COOLING SYSTEM

(75) Inventor: William Earle Rayman, Hartville, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 175 days.

(21) Appl. No.: 09/861,396

(22) Filed: May 18, 2001

(65) Prior Publication Data

US 2002/0170641 A1 Nov. 21, 2002

(51) Int. Cl.[7] .................. B60C 11/00; B60C 11/02; B60C 23/18
(52) U.S. Cl. ............ 152/170; 152/209.6; 152/153; 152/175; 152/176; 152/179
(58) Field of Search ................. 152/153, 170, 152/175, 176, 179, 209.6, 324, 325, 326, 450; 425/37

(56) References Cited

U.S. PATENT DOCUMENTS

| | | | |
|---|---|---|---|
| 2,609,026 A | * 9/1952 | Luchsinger-Caballero | .. 152/176 |
| 3,329,193 A | 7/1967 | Mosebach | ................ 152/340 |
| 3,455,753 A | * 7/1969 | Schelkmann | ................ 156/96 |
| 4,351,380 A | 9/1982 | Pilliod, Jr. et al. | .......... 152/169 |

FOREIGN PATENT DOCUMENTS

| | | | |
|---|---|---|---|
| FR | 858389 | * | 11/1940 |
| GB | 2061837 | * | 5/1981 |

* cited by examiner

*Primary Examiner*—Jeff H. Aftergut
*Assistant Examiner*—Justin Fischer
(74) *Attorney, Agent, or Firm*—David L. King

(57) ABSTRACT

A two-piece tire assembly 10 has a removable tread belt 12 for installing about the circumference of a tire carcass 14. The tread belt 12 has a radially outer ground contracting tread 15 and a radially inner belt reinforcing structure 100 having ply layers forming tread belts 84, 86, 88, 92. Radially inward of the belt reinforcing structure 100 is a radially inner portion 70, the radially inner portion 70 has a radially inner surface 72 in contact with the outer circumferential surface of the carcass 14. In one embodiment of the invention the radially inner surface 72 of the tread belt 12 and outer circumferential surface 71 of the carcass 14 have circumferentially extending grooves 74, 78 and ribs 72, 76 that complimentarily interlock. Traversing the ribs 72, 76 of the carcass or the tread belt are fluid or gas venting subsurface passages 80, 82 that are open to one or more groove 74, 78. The venting subsurface passages 80, 82 provide a convective cooling system for the two-piece tire assembly 10. The carcass 14 has an abrasion resistant rubber layer 81 at the tread belt interface. The tread belt 12 also has the abrasion resistance tread compound 81 at the carcass 14 interface.

6 Claims, 10 Drawing Sheets

TWO PIECE TIRE WITH A CONVECTIVE COOLING SYSTEM

TECHNICAL FIELD

This invention relates to a two-piece pneumatic tire with a removable tread belt mounted on a reinforced beaded tire carcass that is typically for use with earthmoving vehicles.

BACKGROUND OF THE INVENTION

The two piece pneumatic tires of the present invention are generally designed for use on large earthmover vehicles and are subjected to high stress and loads under harsh environmental conditions such as in rock quarries, mines, foundries, and other areas where tires are subjected to puncture-producing and wear-inducing conditions.

As discussed in U.S. Pat. No. 4,351,380, certain prior art tread belt tire assemblies comprise a plurality of ground-engaging shoes spaced about the periphery of the supporting structure. The heavy loads on the shoes result in great stresses being developed that sometimes lead to premature tire failure. The U.S. Pat. No. 4,351,380 is directed to an improved track belt assembly which comprise a plurality of shoes spaced about the periphery of a load-supporting structure and secured to a reinforcing belt structure disposed on the side of the shoe opposite the ground-engaging side thereof.

The large pneumatic tires, which are typically used for earthmoving vehicles, sometimes fail due to the high stress and loads caused by the harsh environmental conditions in which they are operated. These large prior art pneumatic tires had a greater tendency to fail in the crown or shoulder area of the tire due to excessive heat build up.

In the prior art, conventional solutions to these problems include increasing the robustness, and decreasing the tire deformation under load by increasing the sidewall stiffness. To further improve tire durability, the ply turn-up portion of these tires was typically reinforced.

With the continual drive to improve earthmover performance to severe continuous service conditions requiring 20 hours and up of service per day, seven days a week, there is a continuing need to provide novel methods and tire designs for improving earthmover tire durability. The present invention is directed to an improved pneumatic tire carcass and removable tread belt assembly with which the frequency of premature tire failure is thought to be substantially reduced. The present invention is also directed to providing an improved two-piece pneumatic tire assembly, which is designed to operate at long hours without damaging heat buildup. Moreover, the present invention relates to an improved two-piece pneumatic tire wherein a removable tread belt and carcass assembly has an internal cooling capability.

SUMMARY OF THE INVENTION

A two-piece pneumatic tire assembly has a removable tread belt for installing about the outer circumference of the tire carcass. The tread belt has a tread and a belt reinforcing structure located between a pair of lateral edges. The two-piece tire assembly has a plurality of subsurface passages communicating to a lateral edge. The plurality of subsurface passages extends from a central region between the lateral edges of the tread belt of the two-piece tire assembly to a lateral edge. The plurality of subsurface passages are made of a series of grooves or holes in the tread belt. The sub passages are laterally inclined. Additionally, the pneumatic tire may have subsurface passages that are formed by a laterally inclined series of grooves or holes in the carcass.

In one embodiment of the invention, the two-piece tire assembly has a tread belt that has a radially inner portion below the belt reinforcing structure and has a radially inner surface. The radially inner surface having a plurality of circumferentially continuous grooves at ribs. The carcass of this two-piece tire also has a plurality of circumferentially continuous grooves and ribs on the outer circumference of the carcass. The grooves and ribs of the radially inner surface of the radially inner portion of the tread belt and the grooves and ribs of the carcass are aligned to interlock such that the groove in the one portion interlocks with a rib of the other portion. In this embodiment the plurality of subsurface passages traverse the ribs of the tread belt and are open to one or more of the circumferentially continuous grooves of the carcass. The carcass also has a plurality of passages traversing the ribs of the carcass and being opened to one or more of the circumferentially continuous grooves on the inner surface of the tread belt. The passages of the carcass communicate with the subsurface passages of the tread belt forming a convective cooling network from a central region of the tread belt to a lateral edge. In one embodiment of this invention, the subsurface passages of the tread belt can be aligned or intersecting with the passages of the carcass. In this embodiment the passages of the carcass are grooves.

BRIEF DESCRIPTION OF THE DRAWINGS

The invention will be described by way of example and with reference to the accompanying drawings in which.

DEFINITIONS

Figure 1:
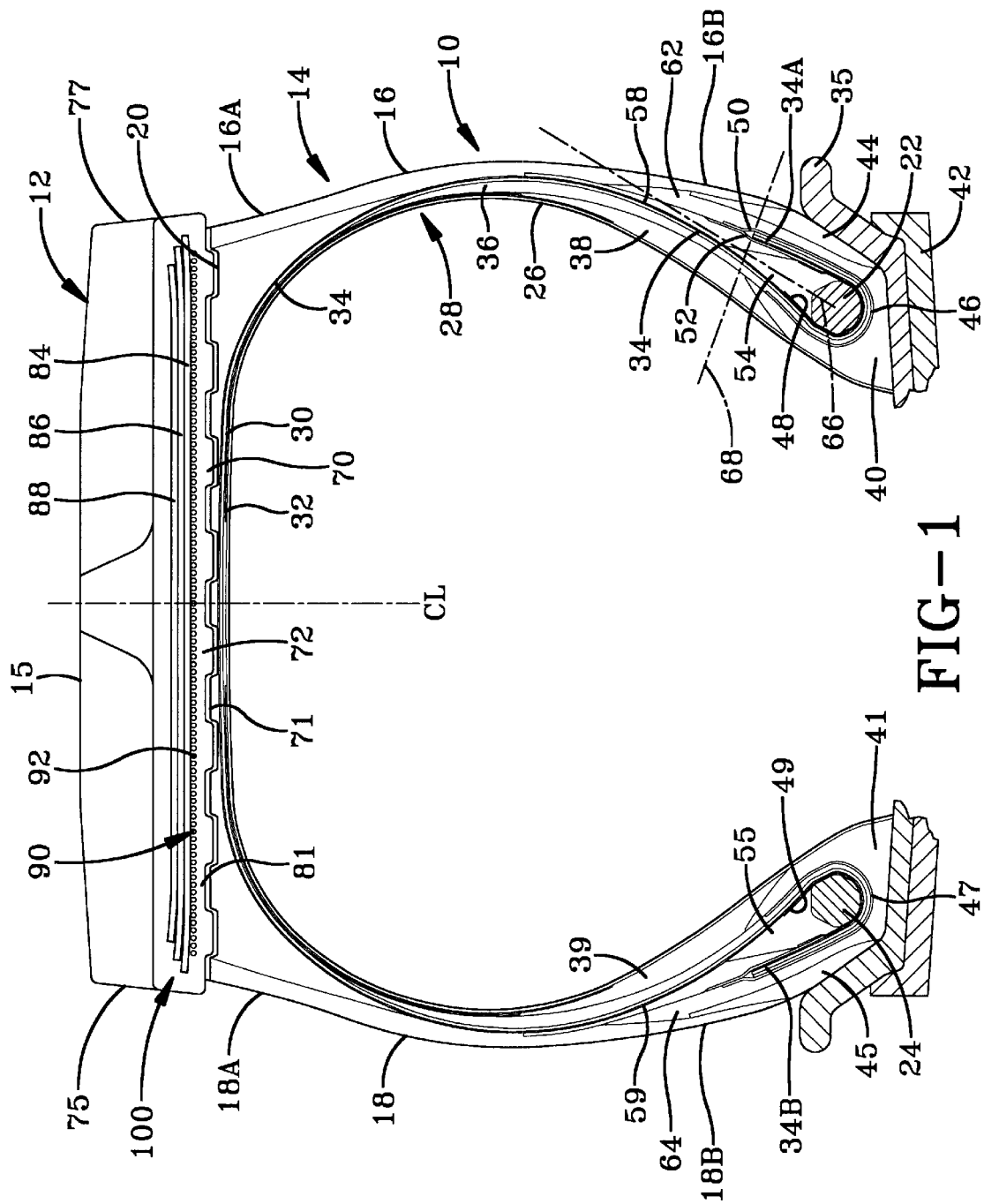
FIG. 1 is a cross-sectional view illustrating the two-piece tire with a removable tire tread belt mounted on an inflatable tire carcass and made in accordance with the present invention.

"Apex" means a non-reinforced elastomer positioned radially about a bead core.

"Aspect ratio" of the tire means the ratio of its section height (SH) to its section width (SW) multiplied by 100% for expression as a percentage.

"Axial" and "axially" mean lines or directions that are parallel to the axis of rotation of the tire.

"Bead" means that part of the tire comprising an annular tensile member wrapped by the ply cords and shaped, with or without other reinforcement elements such as flippers, chippers, apexes, toe guards and chafers, to fit the design rim.

"Belt or breaker reinforcing structure" means at least two layers of plies of parallel cords, woven or unwoven, underlying the tread, unanchored to the bead, and having both left and right cord angles in the range from 17° to 75° with respect to the equatorial plane of the tire.

"Bias ply tire" means a tire having a carcass with reinforcing cords in the carcass ply extending diagonally across the tire from bead core to bead core at about 25–50 angle with respect to the equatorial plane of the tire. Cords run at opposite angles in alternate layers.

"Circumferential" means lines or directions extending along the perimeter of the surface of the annular tread perpendicular to the axial direction.

"Chafers" refers to narrow strips of material placed around the outside of the bead to protect cord plies from degradation and chaffing caused by movement of the rim against the tire.

"Chippers" means a reinforcement structure located in the bead portion of the tire.

"Cord" means one of the reinforcement strands of which the plies in the tire are comprised.

"Equatorial plane (EP)" means the plane perpendicular to the tire's axis of rotation and passing through the center of its tread.

"Flipper" means a reinforced fabric wrapped about the bead core and apex.

"Footprint" means the contact patch or area of contact of the tire tread with a flat surface under load and pressure.

"Inner liner" means the layer or layers of elastomer or other material that form the inside surface of a tubeless tire and that contain the inflating gas or fluid within the tire.

"Net-to-gross ratio" means the ratio of the tire tread rubber that makes contact with the road surface while in the footprint, divided by the area of the tread in the footprint, including non-contacting portions such as grooves.

"Nominal rim diameter" means the diameter of the rim base at the location where the bead of the tire seals.

"Normal inflation pressure" refers to the specific design inflation pressure at a specific load assigned by the appropriate standards organization for the service condition for the tire.

"Normal load" refers to the specific load at a specific design inflation pressure assigned by the appropriate standards organization for the service condition for the tire.

"Ply" means a continuous layer of rubber-coated parallel cords.

"Radial" and "radially" mean directions extending radially toward or away from the axis of rotation of the tire.

"Radial-ply tire" means a belted or circumferentially-restricted pneumatic tire in which the ply cords which extend from bead to bead are laid at cord angles between 65 and 90 with respect to the equatorial plane of the tire.

"Section height (SH)" means the radial distance from the nominal rim diameter to the outer diameter of the tire at its equatorial plane.

DETAILED DESCRIPTION OF THE INVENTION

With reference to FIG. 1, there is illustrated a cross-section of a two-piece pneumatic tire 10 which in the specific exemplary embodiment illustrated is a size 33.00R51 earthmover tire. At an inflation pressure of 102 psi the size 33.00R51 tire has a 119.9 inch (303 cm) maximum inflated outside diameter, a 37.2 inch (94 cm) maximum inflated width tire in the axial directions, and a nominal bead diameter of 51.00 inches (130 cm). The tires are typically inflated to a pressure of about 100 pounds per square inch (psi) with air and sometimes with an air/nitrogen mixture.

The improved two piece pneumatic tire 10 includes a ground engaging, circumferentially extending tread belt 12 mounted on a radially reinforced, beaded tire carcass 14. The beaded tire carcass 14 generally includes a pair of tire sidewalls 16,18 extending radially inwardly from the outer circumferential surface 20 of the tire carcass and terminating at their radial extremities in a pair of bead wires 22,24, respectively. The sidewalls 16, 18 each have an upper portion 16a, 18a, respectively, in the shoulder region of tire carcass 14 and radially inward of the maximum section width of the tire carcass, and a lower portion 16b, 18b, respectively, adjacent the bead wires 22, 24, respectively, and radially inward of the maximum section width of the tire carcass 14. The details of the construction of tire carcass 14 are described in detail hereinafter.

Tire Carcass

Figure 2:
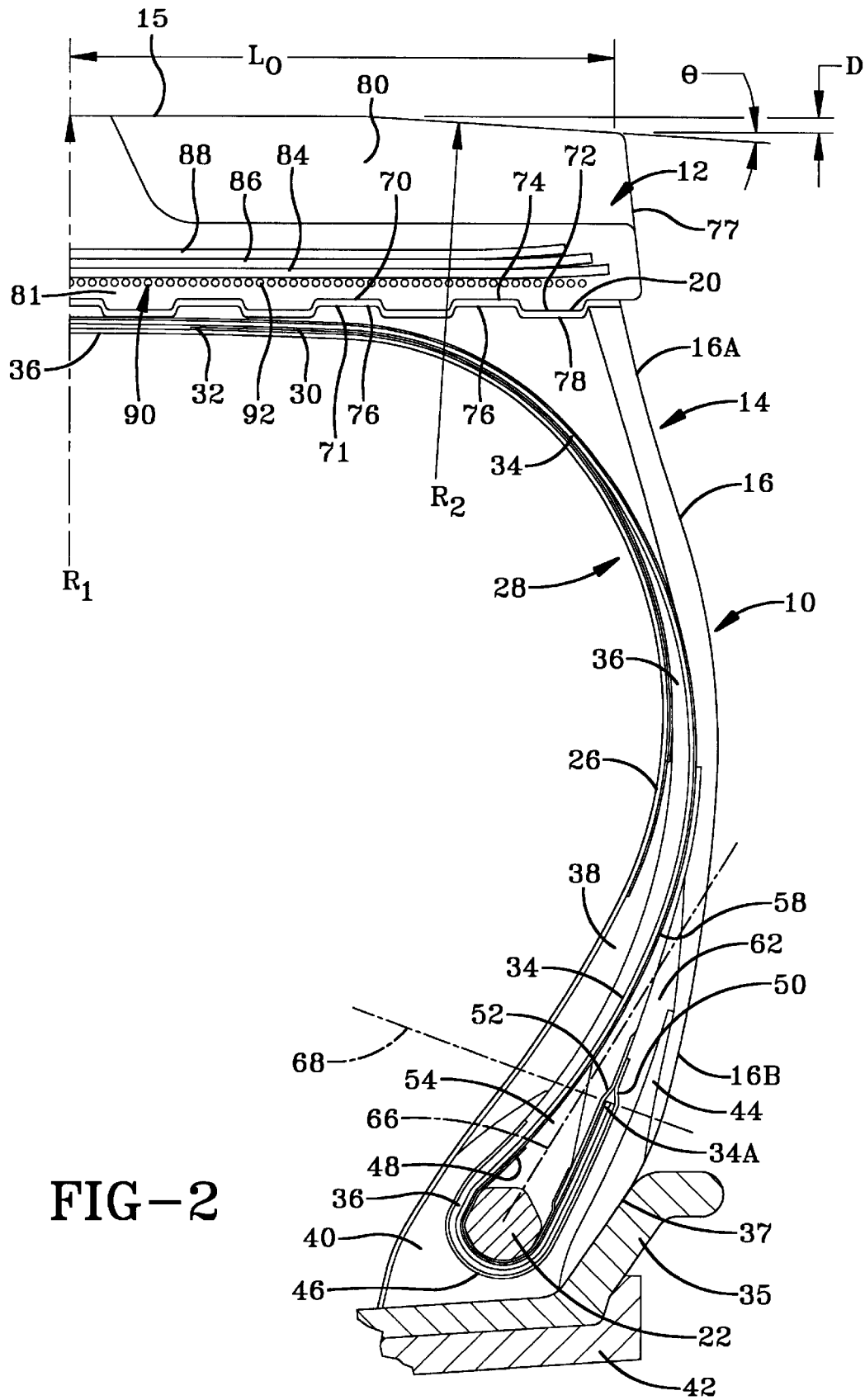
FIG. 2 is an enlarged, cross-sectional view illustrating one side or half of the symmetrical tire shown in FIG. 1 and made in accordance with the present invention.

Referring FIGS. 1 and 2, the details of tire carcass 14 are illustrated. The axially inward surface 28 is an inner ply liner 26, which forms an innerliner that holds the air pressure for inflating tire 10. The inner ply liner 26 covers the entire interior facing surface 28 of the tire carcass 14 and serves to hold the air within the carcass that is used to inflate tire 10. Fabric barrier plies 30 and 32 are provided within the tire carcass 12 in the area of the curved portion of interior surface 28 to provide support for the upper portion of the barrier rubber layer 36 and prevent the barrier rubber from being squeezed through the ply wires in the ply layer 34. While two barrier plies 30 and 32 are illustrated, it is within the terms of the invention to use between zero and four barrier plies, as needed for a specific design.

The carcass 14 also includes in its construction at least one rubberized laminated ply layer 34 of tire cord fabric which extends radially inwardly from the outer circumferential surface 20 of the tire carcass, also called the crown area of the tire carcass, and has turnup ends 34a and 34b which wrap or loop around bead wires 22 and 24, respectively. Although the carcass ply 34 is shown as being of single ply construction, a multi-ply construction can be employed if desired. Preferably, the carcass ply 34 is made of a rubberized ply of steel cord, but it can be made of a non-steel carcass reinforcing material.

At the radially outermost portion of the carcass 14 there is a thin layer of abrasion resistant tread compound 81. The abrasion resistant tread compound 81 forms a tough durable long wearing surface between the tread belt 12 and the carcass 14. The use of tread rubber is an ideal material because it is adapted to form grooves and ridges or as shown in FIGS. 1 and 2, the ribs 76 and grooves 78, which are used to retain the tread belt 12. Preferably the tread compound 81 is identical to the rubber compound used in the tread belt 12, which is also generally a typical rubber blend used for treads.

Between the innerliner 26 and the ply layer 34 is a barrier rubber layer 36, which backs up the entire length of ply layer 34 and is formed of a soft compound of rubber which squeezes against the ply layer 34. Annular stiffeners, known as apexes or apex elements 38, 39 herein, each having a generally triangular shape are provided radially outward of the bead wires 22, 24, respectively, and between the barrier rubber 36 and the innerliner 26. The apexes 38, 39 extend from approximately the mid-sidewall and the area of innerliner 26 radially outward from the bead wires 22, 24, respectively, for stiffening the bead area to help prevent the tire from bending over the flange 35. Axially outward from apexes 38, 39 and between the ply layer 34 where it turns up about bead wires 22, 24 are located lower gum chafers 40, 41, respectively, that support the bead wires 22, 24, respectively, in the area of the wheel mounting rim 42 and to prevent chafing of the tire by an adjacent wheel mounting rim. Upper gum chafers 44, 45 are disposed against the lower gum chafers 40, 41, respectively, and the lower tire sidewalls 16b, 18b, respectively, to provide support for the bead wires 22, 24 in the area of the flange 35 and to prevent chafing of the tire by an adjacent wheel mounting rim.

Between the lower chafers 40, 41 and the rubber barrier 36 in the area partially surrounding bead wires 22, 24 are located fabric or wire chafer plies 46, 47 that support the bead wires 22, 24, respectively. As best seen in FIGS. 2 and 2A, the chafer plies 46 are primarily disposed against the inner facing surfaces of lower chafers 40, 41. Between the inner surface of ply layer 34 and the bead wires 22 and 24 are located flippers 48, 49, respectively, which are reinforced fabric materials that are wrapped about the bead core and at least a portion of one of the apexes. On either side of the ends 34a, 34b of ply layer 34 are two wire coat, gum layers 50 and 52 which cover the ends 34a, 34b, respectively, of ply 34 and enable the movement of ply 34 between the gum layers 50 and 52 without exposing the wire within ply 34 during tire construction or severe bending of the tire.

Apex Configuration

Two annular stiffeners, referred to as apexes 54, 55 herein, each having a generally four sided shape, are provide radially outward of the bead wires 22,24, respectively, between flippers 48,49, and out to apexes 58, 59, for stiffening the area about the bead wires 22, 24, respectively, to help prevent the tire from bending over the flange 35. The apexes 54, 55 are further disposed between the lower inner end of rubberized ply layer 34 and the turn-up ends 34a and 34b. Abutted against and extending radially outward from the apexes 54 and 55 are two annular stiffeners, referred to herein as apexes 58 and 59, respectively, which help support the ends 34a and 34b of rubberized ply layer 34. The apexes 54, 55, are constructed of a relatively hard compound having a modulus of about 12.2–14.9 megapascals/cm$^2$ at 200% elongation. Axially outward from the apexes 58 and 59 are the outer apexes 62 and 64, respectively. The apexes 38, 39, 58, 59, and 62, 64 are generally constructed of the same relatively soft rubber compound having a modulus of about 7.2–8.8 megapascals/cm$^2$ at 200% elongation and act to provide a soft cushion that absorbs the stresses around the turn up ends 34a and 34b of the ply layer 34 which is caused by stress forces generated by the flexing of the tire. While the apexes 38, 39, 58, 59, and 62, 64 are typically constructed of the same rubber compound, it is within the terms of the invention to construct one or more of the apexes with a different modulus within the range of between about 7.2 and 8.8 megapascals/cm$^2$ at 200%. In the preferred embodiment, the apexes 38, 39, 58, 60, 62 and 64 are softer than the apexes 54 and 55 which are located directly adjacent and radially outward from the bead wires 22 and 24, respectively. Preferably the rubber compound used to form the apexes 54 and 55 are about 20% to about 50%, and preferably about 20% to about 50% stiffer than the rubber compound used to form apexes 38, 39, 58, 59, 62 and 64.

Figure 3:
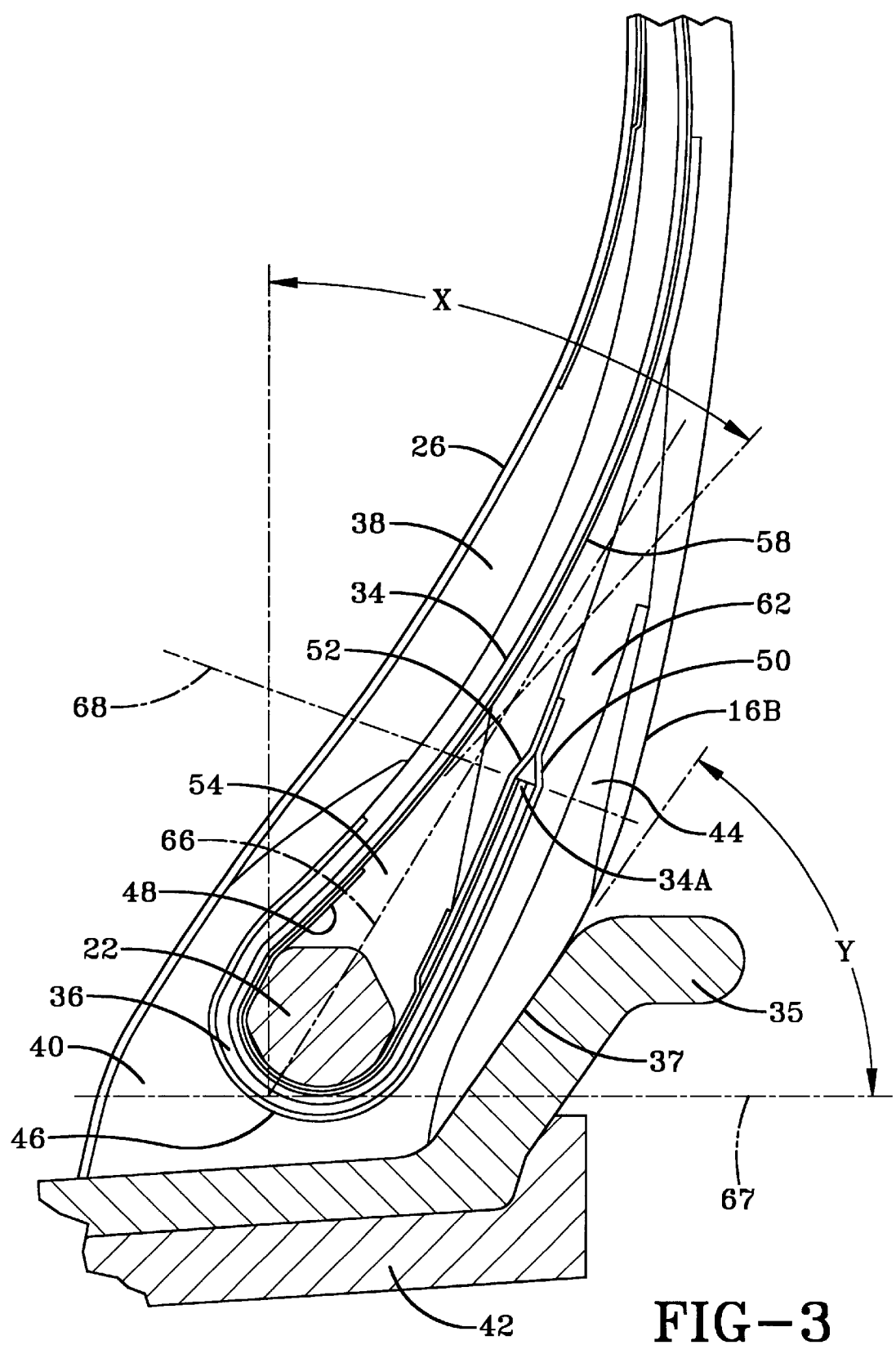
FIG. 3 is an enlarged, cross-sectional view illustrating the bead area of the tire shown in FIG. 2.

The location of the ply turn-up ends 34a and 34b are an important aspect of the carcass design. As best illustrated in FIG. 3, preferably the turn-up ends 34a, 34b are located radially outward a distance of between about 2 and 3 bead diameters from the intersection of a centerline 66 which extends through the center of bead wires 22, 24 and a line 67 which is tangent to the most radially inward surface of the carcass ply 34 where the carcass ply portions 34a, 34b loop around the wire beads 22, 24 to a line 68 which is perpendicular to centerline 66 and is tangent to the outer end of the ply layer 34. This location of the outer ends of the turn-up ends 34a, 34b of ply layer 34 is important in that it can withstand the pressure exerted against the ply end, which was sometimes sufficient to cause the ply end to break through the sidewall in prior art constructions where the turn-up ends extend closer to the center of the tire sidewalls. The advantage of having the outer ends of the turn-up ends 34a, 34b of carcass ply 34 at a lower position closer to the radial outward portion of the flange 35 is so that when operating conditions cause the tire to deflect outwards, the ends of turn-up ends 34a, 34b of the ply layer 34 will be supported by flange 35. This arrangement will greatly reduce the possibility that the outer ends of turn-up ends 34a, 34b will be the cause of a crack in or penetrate axially outward through the sidewall of the tire carcass 14.

The ply line of ply layer 34 follows the natural ply line, which means it is already at its natural shape upon inflation. The carcass ply 34 retains its natural shape when inflated to reduce the inflation strain on the tire. The portion of the ply cord extending down to the bead 22 is equally supported along its length by the axially interior surface 37 of the rim flange 35 which is substantially parallel to the centerline 66 passing though beads 22, 24.

Tread Belt

The ground engaging, circumferentially extending tread belt 12 is removably mounted onto the tire carcass 14. As best shown in FIG. 2, the underside or inner circumference surface 70 of tread belt 12 comprises a plurality of annular ribs 72 and grooves 74 that mate with ribs 76 and grooves 78 of tire carcass 14 to restrain belt 12 from lateral or axial movement with respect to the carcass 14. The tire tread belt 12 includes a tread portion 80 and a belt reinforcing structure 100 having a plurality of tread belts 84, 86, and 88. A radially inner belt layer 84 and 86 have cords of steel having a core strand surrounded by sheath strands. The core strand preferably has a plurality of three filaments forming the core. The wire construction is as described in co-pending application Ser. No. 09/507,316, filed Feb. 18, 2000, entitled STEEL CORD FOR REINFORCING ELASTOMERIC ARTICLES, which is incorporated by reference herein in its entirety. Each tread belt layer 84, 86 has the cords oriented at an angle of 15° to 80° relative to the circumferential direction and spaced at 4 ends per inch. These adjacent layers 84, 86 being equal but oppositely oriented.

The radially outermost third layer 88 has the steel cords oriented at 90° relative to the circumferential direction. This in combination with the belt layers 84, 86 create a very strong construction. Radially inward of these belt reinforcement layers is a unique first reinforcement layer 90 having cords 92 oriented 0° relative to the circumferential direction, preferably spaced at 3 EPI, all of these layers 84, 86,88 and 90 forming the structure 100.

While three tread belts 84–88 are illustrated, it is within the scope of the invention to use other numbers of tread belt layers as needed. The combination of a removable tire tread belt 12 with a tire carcass 14 for use with large earthmoving vehicles is important in that it enables a portion of a tire 10 to be replaced instead of the entire tire in the event that one portion of the tire, i.e., the tire belt 12 or the tire carcass 14, wears out before the other part. Also, it may be desirable to have different types of tread designs such as, for example, driving or steering tread designs. This feature allows for a less expensive means of changing the tire tread to construct the appropriate style of desired tire. This feature greatly reduces the cost of storing spare tires and could even extend the operating time of the tires.

A unique aspect of the present invention is the provision of zero degree wires 92 in the first reinforcement layer 90. The zero degree wires in layer 90 encircle the tire tread belt 12 and are provided to restrict the radially outward growth of the tread belt 12 due to a serious deflection in the tire carcass. By keeping the tire tread belt 12 from expanding radially outward, the tire's tread will maintain a more flat tread profile, which will improve tread life and durability. The zero degree 92 wires in first reinforcement layer 90 eliminate the need for a larger number of belt layers.

With particular reference to the first reinforcement layer 90 it is believed most beneficial to have the axially outermost cords 92 axially inward of the lateral ends of the belt layers 84 and 86. As shown the lateral ends of the belt layer 84 overhang the adjacent first reinforcement layer 90 and project axially outward from the lateral ends of belt layer 86. By insuring the belt layers 84 and 86 overhang or extend beyond the zero degree cords 92 of the first reinforcement layer 90 provides added protection against cut damage of the cords 92. As can be easily appreciated as a large sharp rock is rolled over in the path of the tread belt, the lateral ends of the tread belt can deflect and the belt layers 84, 86 by overhanging actually can bend over the zero degree cords 92 stopping the rock from cutting those cords.

The primary advantage of the tread belt design in the region of the lateral edges is the fact that the lateral edge portions of the tread belt 12 at the surface adjoining the circumferentially outer surface of the carcass 14 extend beyond the carcass 14 as shown at the interface 20 of the tread belt 12 and the carcass 14. This increases the flexibility of the tread belt 12 and improves the handling characteristics of the tire 10. The outer surface of the tread has an inclination of θ, θ being about 4° slope in the lateral portions of the tread and is flat or 0° sloped in the central region. The flat shaped central region extends at least 50% of the total tread width. In the 31.00R51 design, the central portion extends over 9.00 inches and each lateral portion extends from the central portion 25% or less of the total tread width, or about 7.00 inches in the 31.00R51 tire size of the illustrated embodiment tire.

This transition of the tread surface in the region $L_0$ from sloping flat 0° to a 4° radially inward slope creates a shoulder drop-off (D) of at least 10 mm. This feature lowers the tread belt 12 contact pressure in the lateral portions and this generally reduces the shoulder wear particularly in the steering wheel positions. An added benefit is noted in that the deflection of the lateral portion is enhanced by a reduction in the radial height of the tread created by the shoulder drop-off (D). This means that the thinner tread at the lateral ends is easier to deflect radially outwardly but almost paradoxically the amount of inward pressuring trying to deflect inwardly the tread edge is lowered by the sloping shoulder. In combination this insures that while the tread belt is deliberately made flexible at the lateral edge to accommodate large stones and rock, preferably, the entire central region of the tread has even footprint pressures at the crown wherein the tread is fully supported. Ideally, the footprint pressure at the shoulders of the tread are equal to, or slightly less than, the central region.

At the interface between the carcass 14 and the tread belt 12 it is believed desirable that the tread belt 12 overhangs the inflated and unloaded carcass by an amount of at least 15 mm or 4% of the carcass width as measured at the interface 20. As the tire 10 is placed under normal load the carcass 14 expands radially outwardly to a location almost aligned with the lateral end of the tread belt 12. It is believed less desirable to have the carcass 14 at the tread belt 12 interface to be extending laterally outward of the tread belt 12. The subtle relative movement of the tread belt 12 to the carcass 14 means that to insure the carcass 14 is not exposed requires the tread belt 12 to actually overhang the carcass 14 at the interface. While large amounts of overhang may be feasible it is considered inefficient to allow the tread belt 12 to extend beyond the maximum section width of the carcass. This is true for several reasons, first being each 1 inch of axial tread belt width on large sized tires such as 31.00R51 tire weighs approximately 100 lbs., secondarily the tread thickness is about 5.00 inches or greater and the distance to a location of the maximum section width of the carcass is another 24 inches meaning the rocks and debris most likely to damage the carcass 14 will strike at the tread belt interface. Rocks 30 inches or greater simply are too unlikely to be traversable in the quarry and therefore create no realistic threat to carcass damage, thirdly because the present invention has the lateral edges to be of a reduced stiffness to facilitate some degree of deflection radially inwardly, too large of an overhang could lead to flexure fatigue in the first reinforcement layer 90 requiring stiffening of the tread belt as was done in the prior art patent U.S. Pat. No. 4,050,495.

It is apparent that there has been provided in accordance with this invention apparatus and methods for constructing an improved two piece tire 10 and removable tread belt assembly wherein the tire durability has been substantially increased by the inclusion of an improved apex construction. The improved carcass and removable tread belt assembly allow large tires to be transported in several sections and then assembled at the delivery site. Further, the removable tread belt assembly allows a different tread belt 12 to be applied to a tire carcass 14 so as to alter the driving characteristics of the tire quickly and economically.

The two piece tire 10 as described in the preceding pages is an example of one embodiment of a two piece type tire having a removable tread belt 12 and a carcass 14.

The two piece tire 10 of the present invention can have generally any type of removable rubber reinforced tread belt 12 or pneumatic carcass 14. What makes such a design unique is that it facilitates the ability to cool the tire assembly from excessive heat build up internally below the radially outer surface of the tread. Typical cooling of the tire assembly could be achieved by employing deep external tread grooves. The present invention permits a way to cool the tire 10 internally from a location near the source of the heat build up. For the purposes of this invention the term subsurface passage 80 or passage 82 means a cooling path generally below the outer tread surfaces to distinguish from external tread groove, it being understood the passage can open into a tread groove or tread edge.

Figure 9:
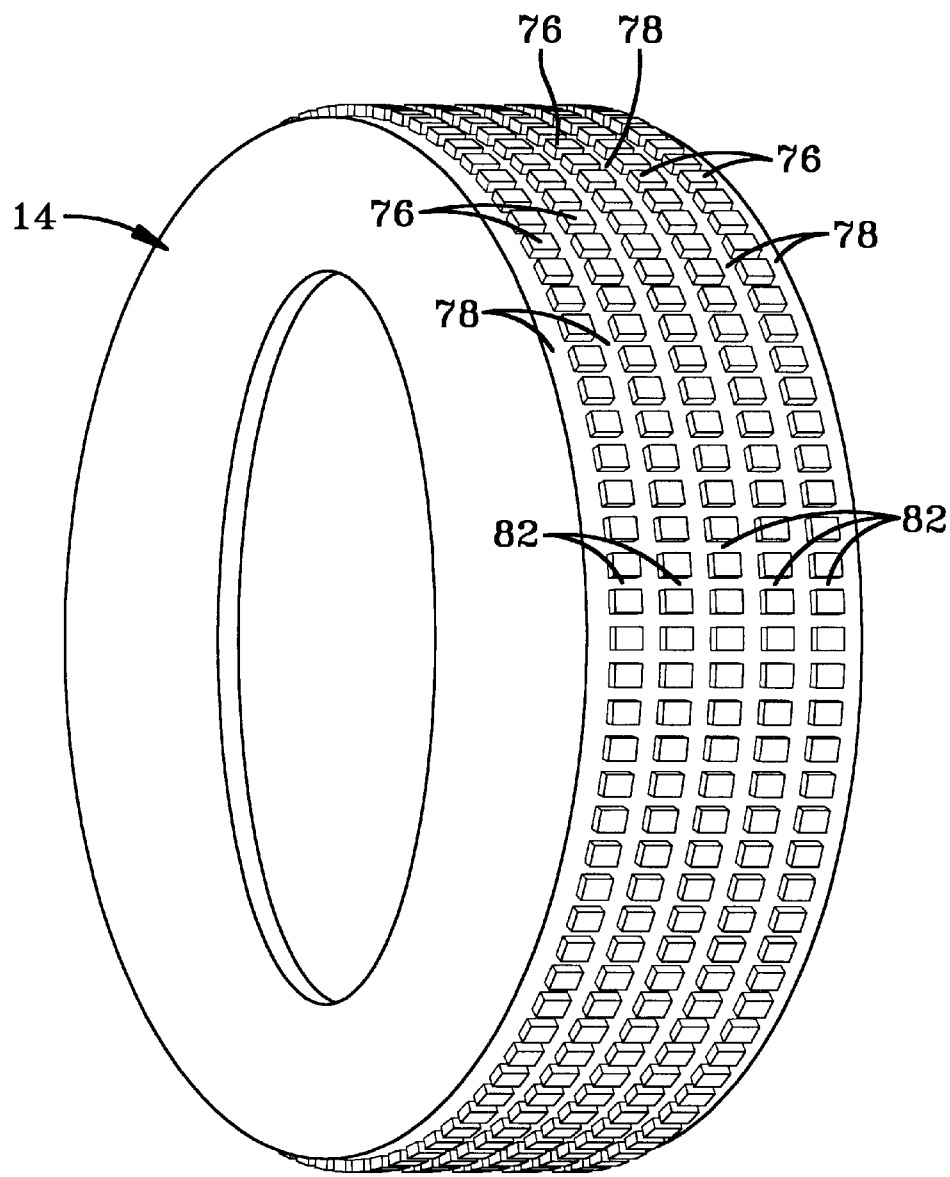
FIG. 9 is a perspective view of the carcass according to one embodiment of the invention.
Figure 10:
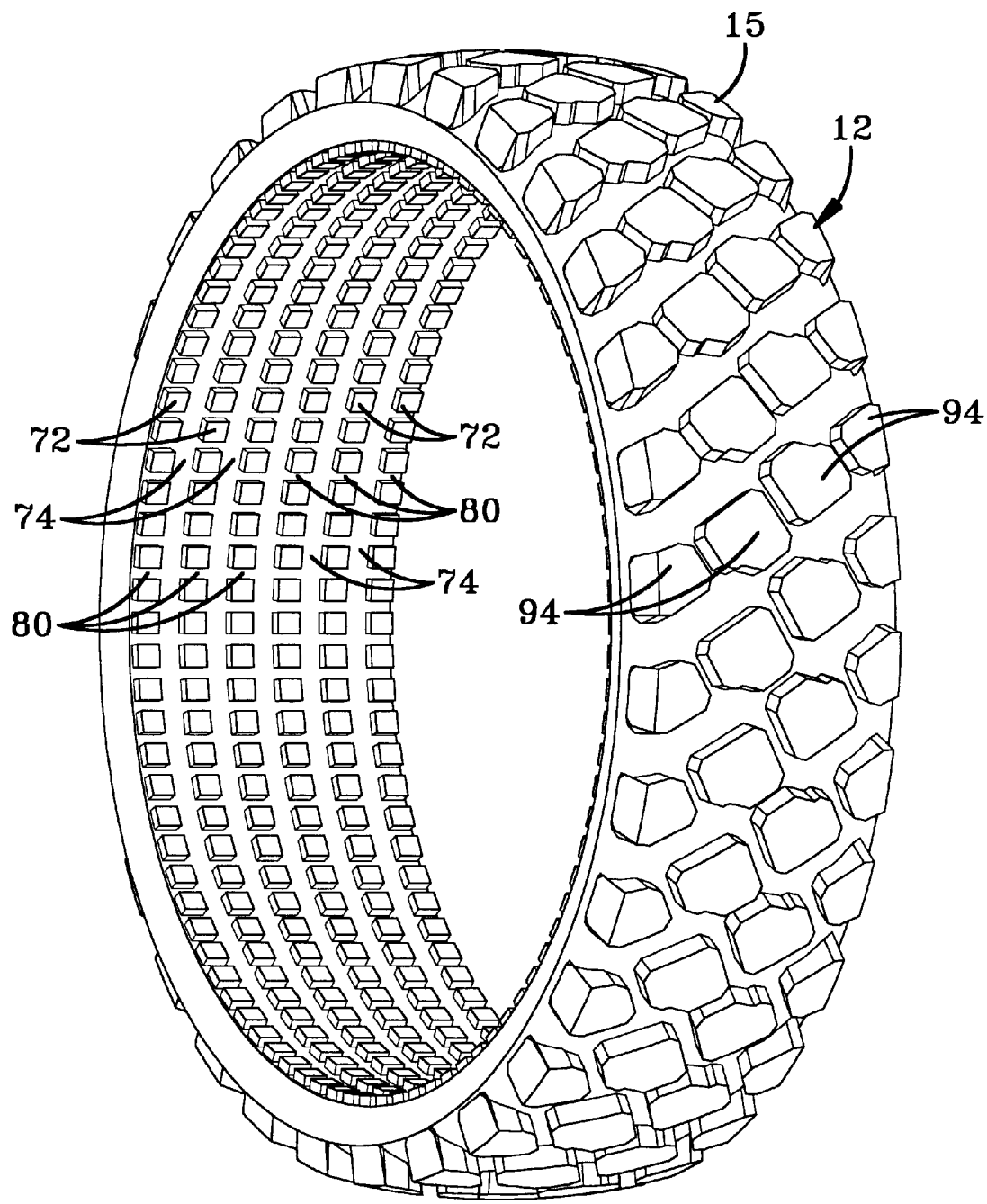
FIG. 10 is a perspective view of a tread belt according to one embodiment of the invention.

A unique cooling system has been integrated into the tread belt 12 and the carcass 14 of this two-piece tire as illustrated in FIGS. 9 and 10. This convective cooling concept permits the tread belt 12 to dissipate heat outward from the internal surfaces of the tread belt 12 towards the lateral edge. Similarly, the carcass 14 can employ some cooling passages 82 that similarly allow convected heat to be transferred toward the lateral edges 75, 77 of the two-piece tire 10. These subsurface passages 80 in the tread belt 12 or passage 82 in the carcass 14 enable a fluid such as gas or a liquid to be transferred from the interior of the tire 10 towards the lateral edges 75, 77 enabling the heat build up to be transferred from the internal surfaces of the tread belt 12 or carcass 14 towards the lateral edge 75, 77 maintaining the temperature in this area below what would otherwise be achievable had the tire 10 been made integral with the tread belt 12 package being molded directly to the carcass.

Figure 4:
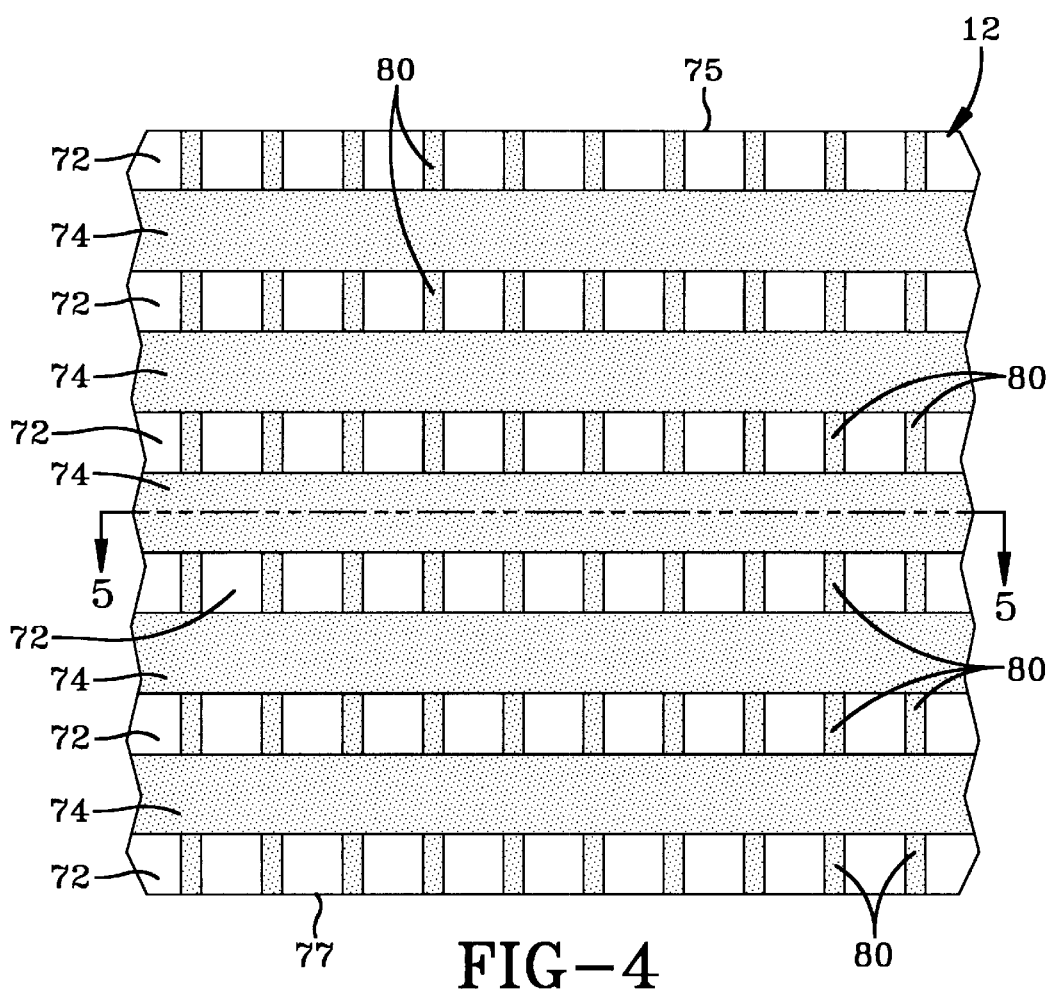
FIG. 4 is a plan view of a portion of the inner surface of the tread belt.

With reference to FIG. 4, a portion of the radially inner surface of the tread belt 12 is shown in plan view. As shown, between the lateral edges 75, 77 of the tread belt 12 there shown six circumferentially continuous ribs 72 interposed between the circumferentially continuous ribs are five circumferentially continuous grooves 74. In the embodiment illustrated, there are pluralities of laterally extending subpassages 80 in the form of grooves traversing each rib 72. These laterally extending grooves 80 intersect one or more circumferentially continuous groove 74 of the inner tread surface 72. As shown, these lateral extending grooves 80 are inclined at approximately parallel to the axes of the tread belt 12. It is understood that these lateral extending grooves 80 could be inclined at any other angle. It is only sufficient that they traverse intersecting the grooves 74.

Figure 5:
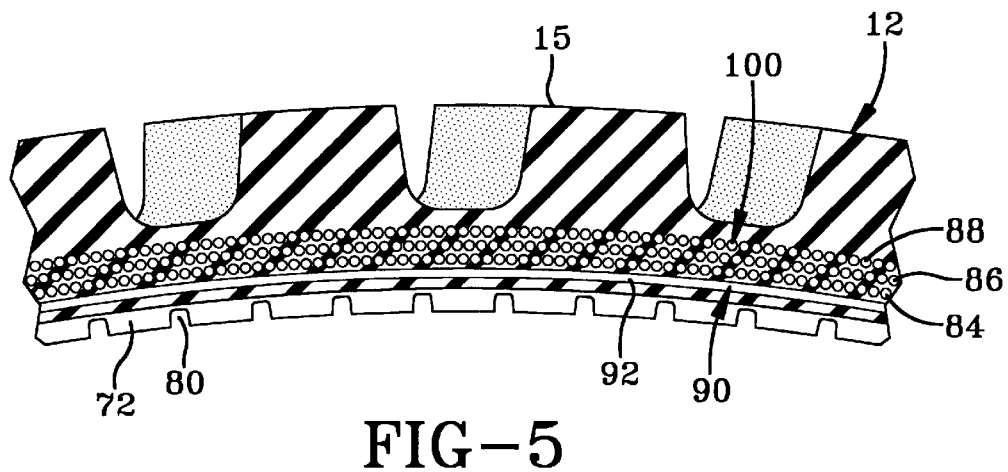
FIG. 5 is a cross sectional view taken along lines 5—5 from FIG. 4.

With reference to FIG. 5, the cross section is shown of the subsurface passages 80. As can be easily appreciated, when the tread belt 12 is mounted onto the carcass 14 the ribs 72 fit into the grooves 78 of the carcass 14. These laterally extending subsurface passages 80 create an air or fluid passage between the ribs 72 and the circumferentially continuous grooves 74 in the tread belt 12.

Figure 6:
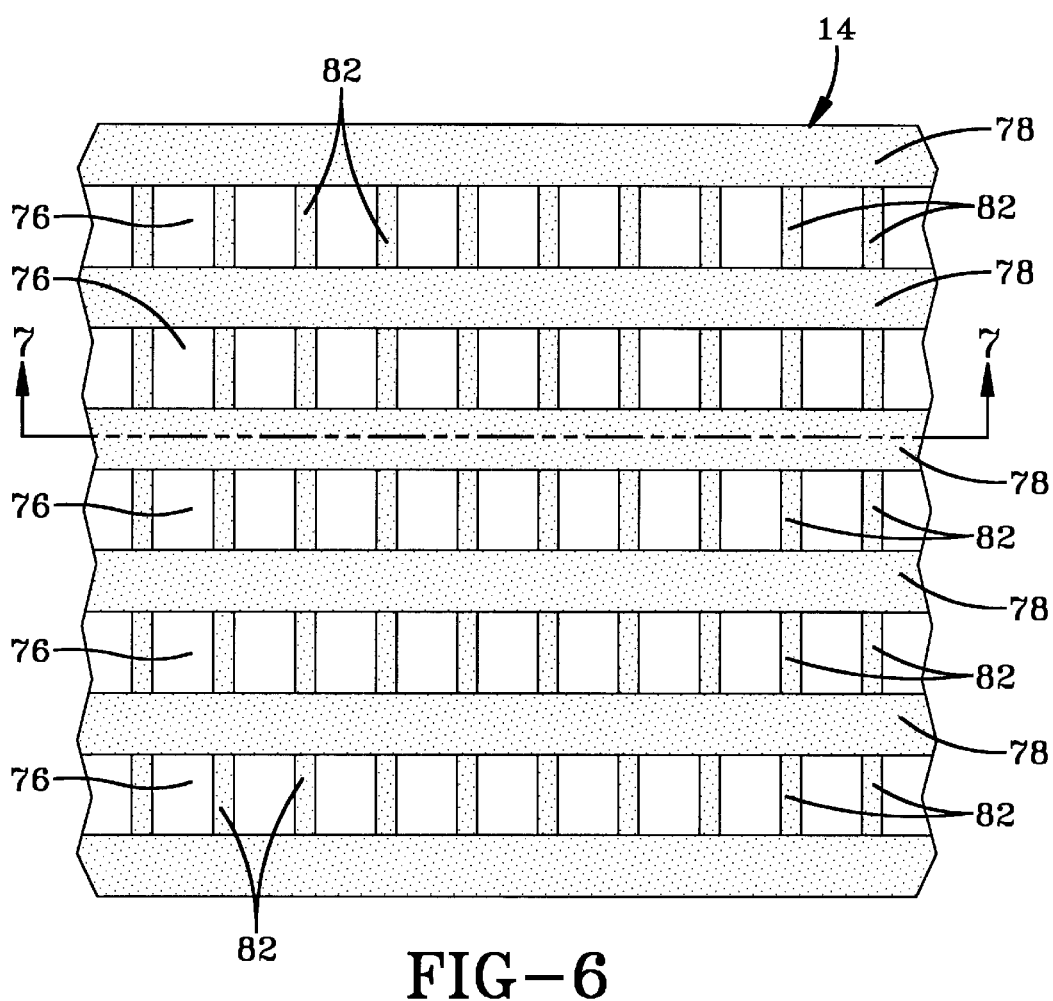
FIG. 6 is a plan view of a portion of the outer circumference of the carcass.
Figure 7:
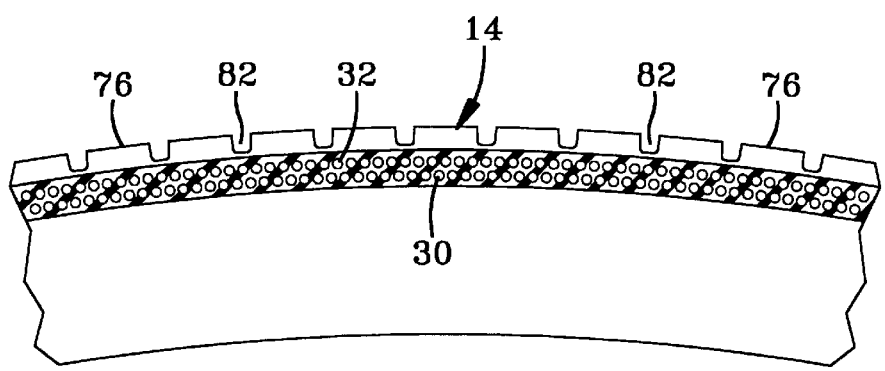
FIG. 7 is a cross sectional view taken along lines 7—7 from FIG. 6.

With reference to FIG. 6, there is shown a plan view of the portion of the outer circumferential surface 71 of the carcass 14. As shown, the carcass 14 has a corresponding number of ribs 76 equal to the number of grooves 74 in the tread belt 12. These ribs 76 are designed to fit within the grooves 74 of the tread belt 12. Each rib 76 has a plurality of laterally inclined passages 82 traversing between each rib 76 and intersecting a groove 78. As illustrated in FIG. 7, a cross sectional view taken along line 7—7 in FIG. 6 shows that the lateral passages 82 traversing the ribs 76 are of a sufficient depth such that once the tread belt 12 is mounted onto the carcass 14 and the tire 10 is fully loaded these subsurface passages 80 and passages 82 remain open. As can be seen, when the tread belt 12 is assembled to the carcass 14 the subsurface passages 80 of the tread belt 12 and the passages 82 of the carcass 14 communicate in such a fashion that an open network is created whereby heat from the central portion of the tire 10 between the tread belt 12 and the carcass 14 can be dissipated. Throughout this network of passages 82 and subsurface passages 80, interestingly, as the tire 10 rotates there is some compression of these subsurface passages 80 and passages 82 causing them to squeeze slightly closed as the tire rotates into the footprints, as the tire leaves the footprint, this contraction of the subsurface passages 80 and passages 82 relaxes and tends to open slightly. What this phenomena is creating is an action similar to a peristaltic pump whereby the opening is contracted slightly and as the tire rotates through the footprint, the volumetric opening expands slightly. This creates a slight pushing of air or fluid out and drawing of air or fluid in each time the tire rotates. This phenomena of moving air or fluid in and out as the tires rotating during normal use creates an increase in convective heat transfer facilitating a more rapid cooling than otherwise would be appreciated or expected by such features.

Figure 11A:
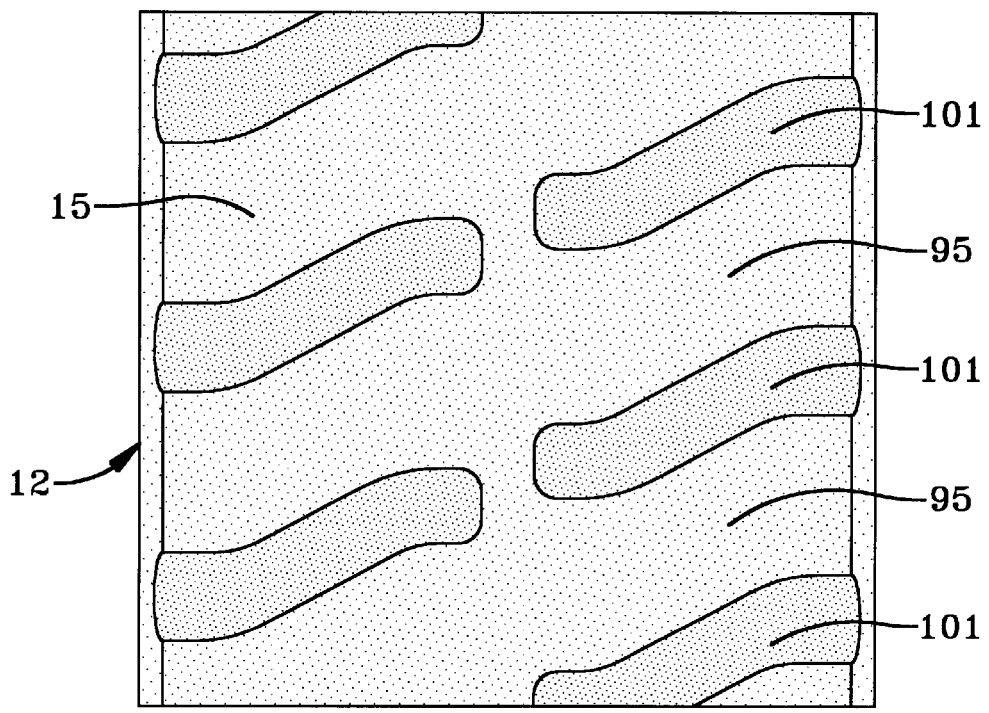
FIGS. 11A, 11B, and 11C represent three different tread patterns for the tread belt of the present invention.
Figure 11B:
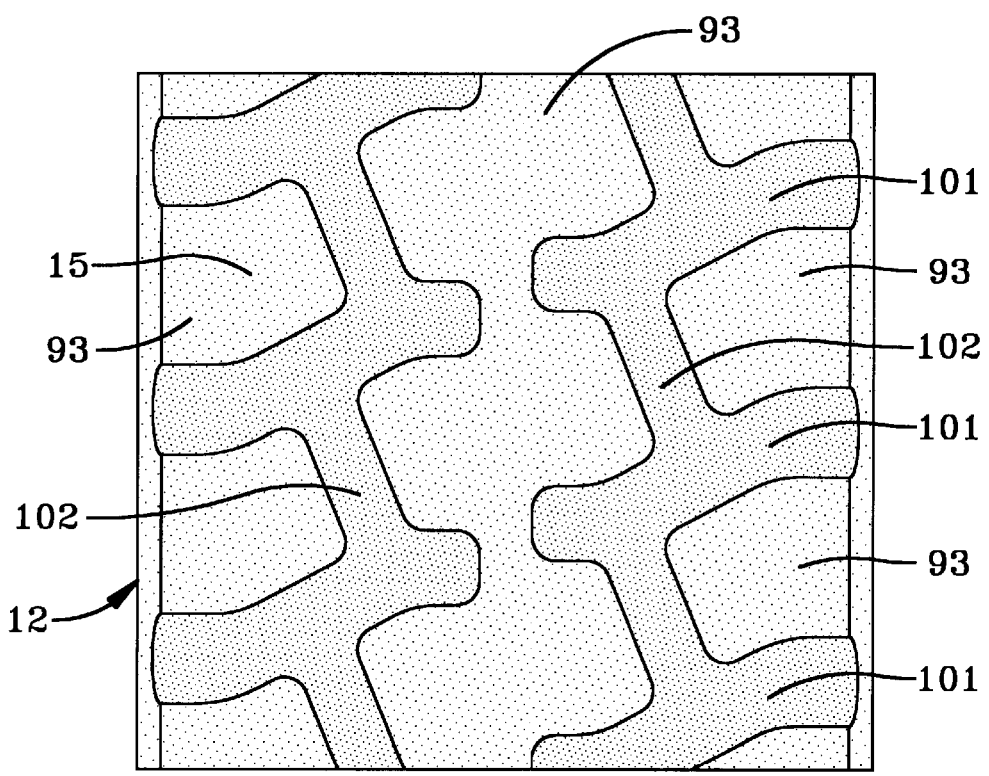
Figure 11C:
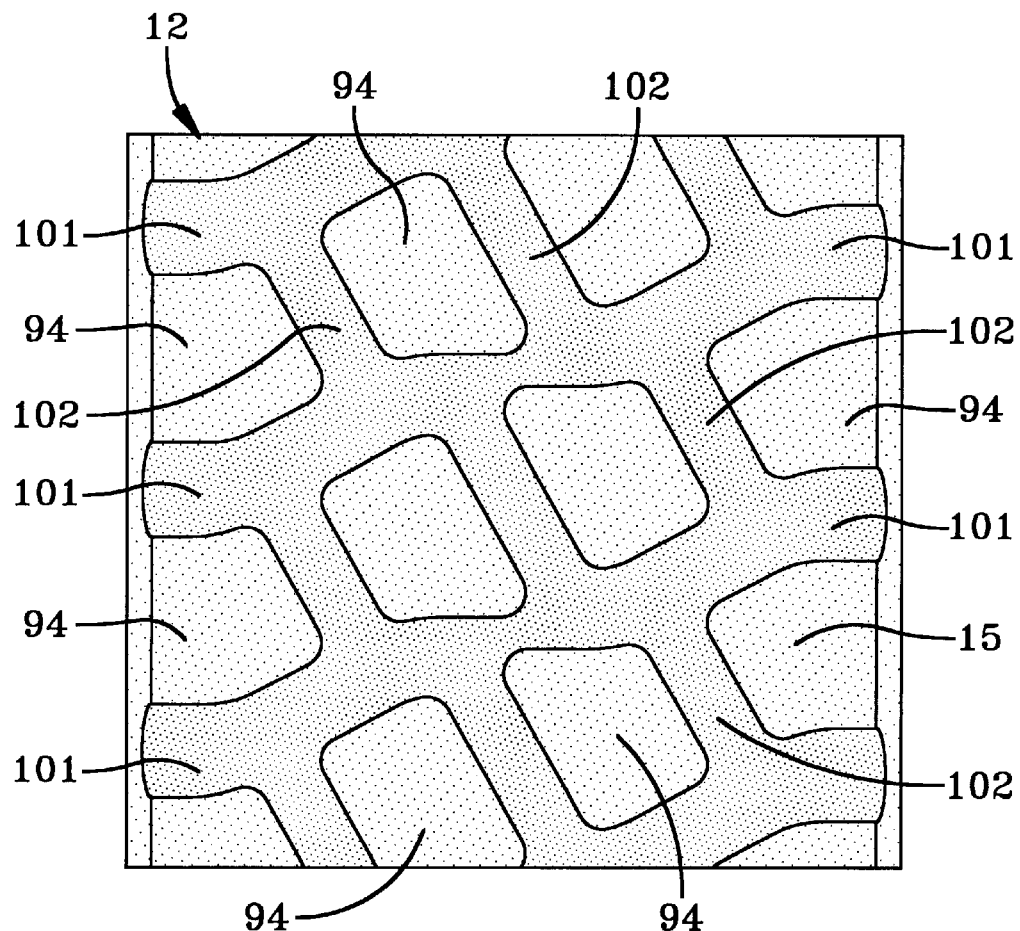

With reference to FIGS. 11A, 11B, and 11C the tread belt 12 is shown with these different style tread patterns. This cooling action is demonstrated by the addition of passages 82 and subsurface passages 80 creating a network or a cooling system for convective heat transfer was noticeably more beneficial when the tread pattern 91 on the exterior of the tread belt 12 was opened by grooves 101, 102 defining rows of three blocks 93 or four blocks 94. When the tread pattern was a continuous bar or lug 95 extending across the tread width creating a large mass of rubber without any grooving on the exterior surface other than for intermittent lateral grooves 101, the benefits of a convective heat transfer appeared to be somewhat lessened. This was believed true based on the fact that the convective heat transfer and cooling while occurring was doing so at a rate insufficient to keep up with the rate of heat buildup due to the massive lug shape. Nevertheless, it was believed beneficial to even the large lugged tire in that the time in which it took to get to a very elevated temperature was delayed from what had been observed absent this cooling system.

Nevertheless, in the tread patterns having three blocks 93 and four blocks 94, which are commonly used in earthmover tires, this design feature demonstrated an ability to maintain the tread belt 12 temperature at the carcass inner face at approximately 30° to 40° Fahrenheit below what was seen as peak temperatures without this air-cooling system.

Since heat is the primary cause of tire degradation, it must be appreciated that these large tires having massive treads and carcasses see temperatures well above 250° Fahrenheit and in some cases sufficiently high to cause reversion of the rubber. With this cooling system in place, it has been determined that the same tires can operate at conditions that exhibited approximately 20° to 30° Fahrenheit reduction in operating temperature at this interface between the carcass 14 and the tread belt 12.

Figure 8A:
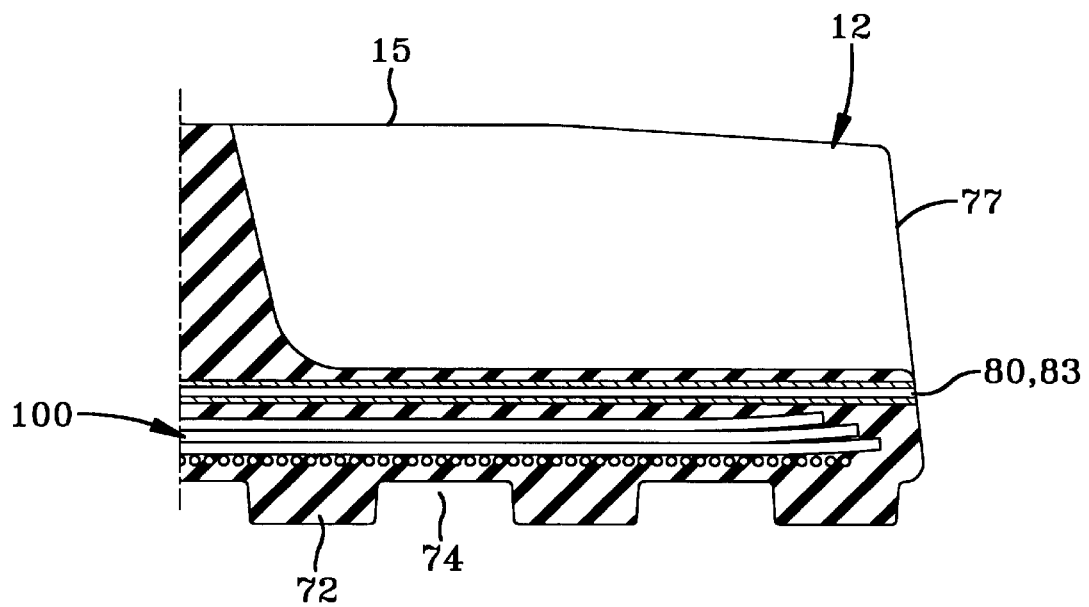
FIG. 8A is a cross section of another embodiment wherein the subpassages are above the belt reinforcing structure.

With reference to FIG. 8A, another embodiment of the invention is shown wherein the tread belt 12 has subsurface passages 80 that extend from a central portion of the tread towards to the lateral edge 75, 77. These tread subsurface passages 80 as illustrated lie above the belt reinforcing structure 100, but lie below the external surfaces of the tread 12. Alternatively, it has been determined that these subsurface passages 80 can be interposed between the belt reinforcing structure 100 as in another alternative for providing a network of convective cooling. In this embodiment, the sub passages can be simply holes that can be molded in or drilled in to the tread belt structure to provide a sufficient amount of cooling or the holes 80 can be formed by tubes 83 as illustrated.

Figure 8B:
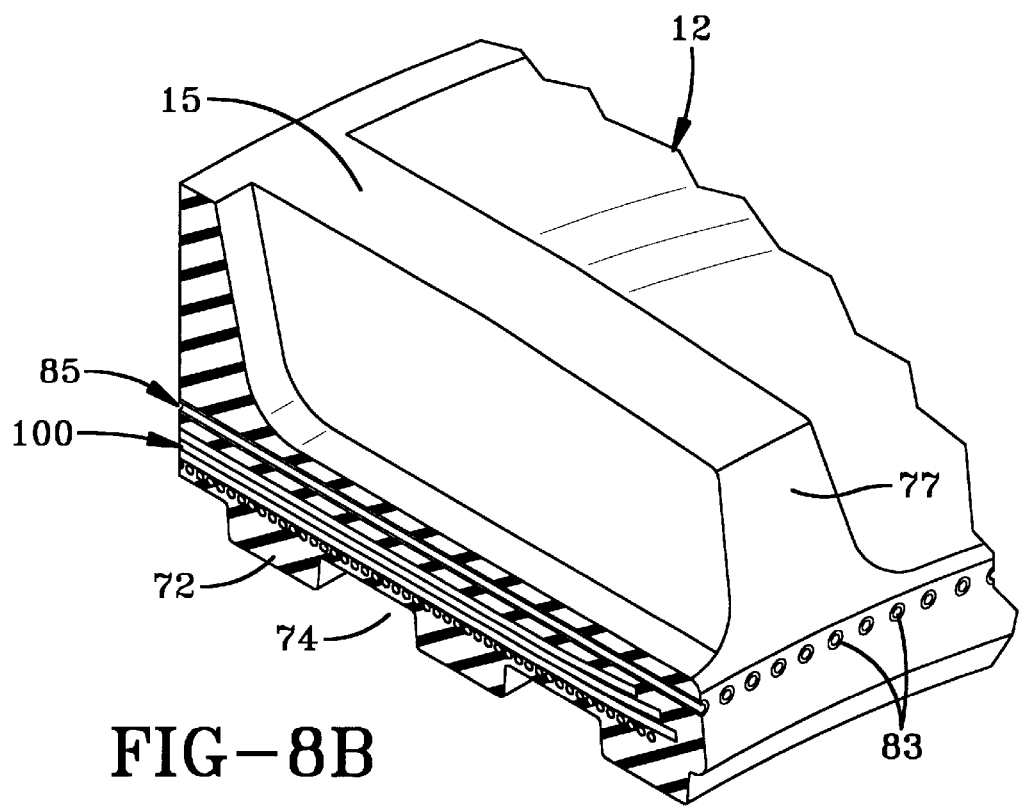
FIG. 8B is an embodiment wherein the subpassages are formed by tubes arranged in a belt layer.

In FIG. 8B, this alternative embodiment is shown where the sub passages formed by tubes 83 arranged in a belt layer 85. The tubes 83 are maintained open during the molding process and simply provide a convective path from the central portion of the tread belt 12 to the lateral edges 75, 77. In this embodiment the tubes 83 are being somewhat flexible rely primarily on convective heat transfer to drive the heat generated by the operation of the tire 10 from the central portion and interior portion of the tread belt 12 towards the lateral edge 75, 77. The tubes 83 can be wrapped with wire, the tubes forming a hollow core shealthed by wire strands to form a belt layer 85 that provides a means for venting to a lateral edge 75, 77 of the tread belt 12. Accordingly, this belt layer 85 can be inclined in such a way that the tubes 83 intersect the lateral edge form these subsurface passages 80. This belt layer 85 can be used in combination with conventional belt layers 84, 86, 88 or as a replacement for one or more such belt layers.

While it can be easily appreciated that normally cooling of an earthmover tire can be achieved by grooving the exterior surface of the tread such that the heat has a shorter path in which to dissipate into the air. This has a disadvantage of reducing the amount of tread rubber in contact with the road, and can facilitate a more rapid wearing of the tread surface. The present invention provides a means of providing heat transfer in a more efficient manner without necessarily increasing the number of grooves in the outer tread surface.

In the first embodiment illustrated in FIGS. 4 through 6, the utilization of subsurface passages 80 and passages 82 along the interface of the carcass and tread belt creates a means for creating a highly efficient method for evacuating the heat from the central portion of the tread to the lateral edges thereby maintaining the region in the tread belt reinforcing structure 100 at temperatures generally 20° to 30° Fahrenheit below what would be seen during normal operation.

It is believed similar benefits can be occurred when these openings are positioned above the tread reinforcing structure 100, however, in those cases the subsurface passages will be either tubing and/or holes and therefore increase the complexity of molding slightly. As can be easily appreciated, any two-piece tire having a high temperature exposure during use can benefit from the invention as described above.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A two piece pneumatic tire assembly having a removable tread belt for installing about the outer circumference of a tire carcass, the tread belt having a tread and a belt reinforcing structure located between a pair of lateral edges, the two piece tire assembly comprising:

a plurality of subsurface passages communicating to a lateral edge, the plurality of subsurface passages extend from a central region between the lateral edges of the tread belt of the two piece tire assembly and open to a lateral edge and wherein the tread belt has a radially inner portion below the belt reinforcing structure and having a radially inner surface, the radially inner surface having a plurality of circumferentially continuous grooves and ribs; and the carcass has a plurality of circumferentially continuous grooves and ribs on the outer circumference of the carcass, the grooves and ribs of the radially inner portion of the tread belt and the grooves and ribs of the carcass being aligned to interlock, and the carcass has a plurality of passages traversing the ribs of the carcass and being open to one or more circumferentially continuous grooves of the inner surface of the tread belt wherein the passages of carcass communicate with the subsurface passages of the tread belt forming a convective cooling network from a central region of the tread belt to a lateral edge.

2. The two piece tire assembly of claim 1 wherein the plurality of subsurface passages are laterally inclined series of grooves or holes in the tread belt.

3. The two piece tire assembly of claim 1, wherein the subsurface passages are a laterally inclined series of passages in the form of grooves or holes in the carcass.

4. The two-piece tire assembly of claim 1 wherein the plurality of subsurface passages traverse the ribs of the tread belt and are open to one or more circumferentially continuous grooves of the carcass.

5. The two piece tire assembly of claim 1 wherein the subsurface passages of the tread belt are aligned or intersected with the passages of the carcass.

6. The two piece tire assembly of claim 5, wherein the passages of the carcasses are grooves.

* * * * *